(12) United States Patent
Fishwick (10) Patent No.: US 11,257,179 B2
(45) Date of Patent: Feb. 22, 2022

(54) GRAPHICS PROCESSING TECHNIQUES BASED ON FRAME PORTION COST ESTIMATES

(71) Applicant: Apple Inc., Cupertino, CA (US)

(72) Inventor: Steven Fishwick, Kings Langley (GB)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/818,671

(22) Filed: Mar. 13, 2020

(65) Prior Publication Data

US 2021/0287324 A1 Sep. 16, 2021

(51) Int. Cl.
*G06T 1/20* (2006.01)
*G06T 15/00* (2011.01)

(52) U.S. Cl.
CPC .............. *G06T 1/20* (2013.01); *G06T 15/005* (2013.01); *G06T 2210/52* (2013.01)

(58) Field of Classification Search
CPC ................................ G06T 15/005; G06T 1/20
See application file for complete search history.

(56) References Cited

U.S. PATENT DOCUMENTS

| 8,982,136 | B2 | 3/2015 | Ribble et al. |
| 8,988,441 | B2 | 3/2015 | Hutchins |
| 10,204,391 | B2 | 2/2019 | Heggelund et al. |
| 10,249,016 | B2 | 4/2019 | Broadhurst et al. |
| 10,387,990 | B2 | 8/2019 | Broadhurst et al. |
| 10,395,336 | B2 | 8/2019 | Howson et al. |
| 10,902,550 | B2 * | 1/2021 | Howson .................. G06T 11/40 |
| 2014/0022266 | A1 * | 1/2014 | Metz .......... G06T 1/20 345/522 |
| 2020/0005423 | A1 * | 1/2020 | Bonfiglioli ............ G06F 9/3855 |
| 2020/0005702 | A1 * | 1/2020 | Peng ..................... G06F 1/3206 |
| 2020/0020067 | A1 * | 1/2020 | Liang ....................... G06T 1/20 |

* cited by examiner

*Primary Examiner* — Samantha (Yuehan) Wang (74) *Attorney, Agent, or Firm* — Kowert, Hood, Munyon, Rankin & Goetzel, P.C.

(57) ABSTRACT

Techniques are disclosed relating to using cost estimates for portions of a graphics frame to schedule graphics rendering tasks. In some embodiments, a processor generates a first set of cost estimates for respective different portions of a frame for a first render and a second set of cost estimates for respective different portions of a frame for a second render. In some embodiments, the processor compares the first set of cost estimates with the second set of cost estimates. In response to an output of the comparison meeting a first threshold level of similarity, the graphics processor may use one or more portions of the frame generated by the first render for the second render instead of performing the second render for the one or more portions.

20 Claims, 9 Drawing Sheets

GRAPHICS PROCESSING TECHNIQUES BASED ON FRAME PORTION COST ESTIMATES

BACKGROUND

Technical Field

This disclosure relates generally to graphics processors and more particularly to techniques for determining and using cost estimates for portions of a frame of graphics data.

Description of the Related Art

Processors such as graphics processing units (GPUs) may schedule graphics work at various appropriate granularities. It may be useful in various contexts to estimate the amount of work for a render of a graphics frame or portions thereof. For example, some GPUs perform tile-based deferred rendering and the GPU may generate tile group cost estimates. The cost estimates may be determined based on various input data such as: the number of primitives, types of objects (e.g., opaque, translucent, or punch-through), coverage area of primitives, tessellation patches, user input, texture information, level of detail, etc.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "programmable shader processor configured to execute a shader program" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

Further, as used herein, the terms "first," "second," "third," etc. do not necessarily imply an ordering (e.g., temporal) between elements. For example, a referring to a "first" graphics operation and a "second" graphics operation does not imply an ordering of the graphics operation, absent additional language constraining the temporal relationship between these operations. In short, references such as "first," "second," etc. are used as labels for ease of reference in the description and the appended claims.

DETAILED DESCRIPTION

Graphics Processing Overview

Figure 1A:
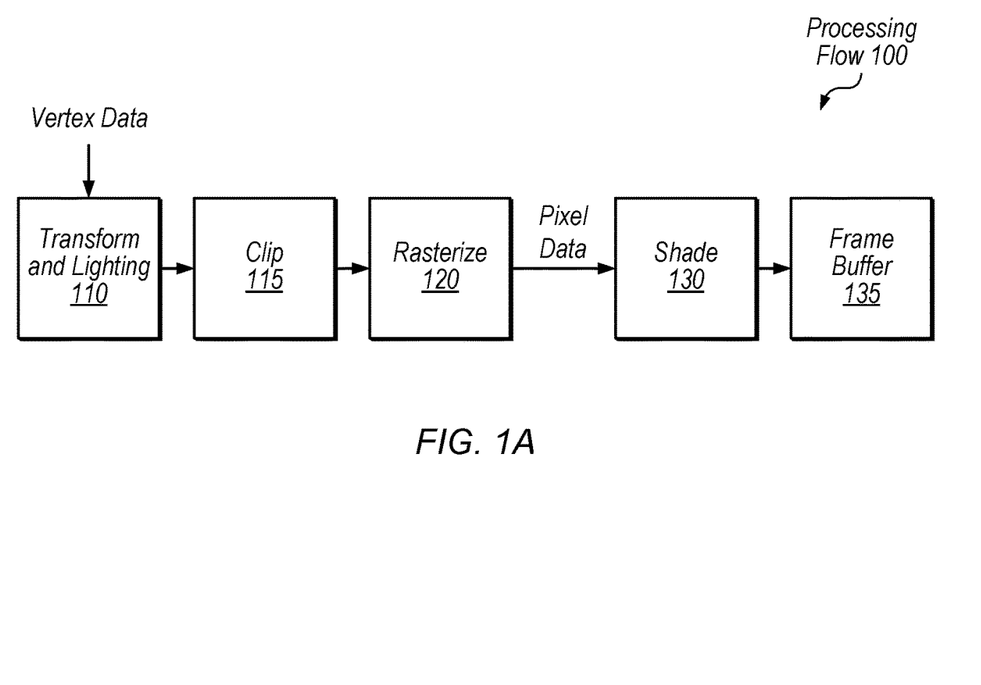
FIG. 1A is a diagram illustrating an overview of example graphics processing operations, according to some embodiments.

Referring to FIG. 1A, a flow diagram illustrating an example processing flow 100 for processing graphics data is shown. In some embodiments, transform and lighting step 110 may involve processing lighting information for vertices received from an application based on defined light source locations, reflectance, etc., assembling the vertices into polygons (e.g., triangles), and/or transforming the polygons to the correct size and orientation based on position in a three-dimensional space. Clip step 115 may involve discarding polygons or vertices that fall outside of a viewable area. Rasterize step 120 may involve defining fragments within each polygon and assigning initial color values for each fragment, e.g., based on texture coordinates of the vertices of the polygon. Fragments may specify attributes for pixels which they overlap, but the actual pixel attributes may be determined based on combining multiple fragments (e.g., in a frame buffer) and/or ignoring one or more fragments (e.g., if they are covered by other objects). Shade step 130 may involve altering pixel components based on lighting, shadows, bump mapping, translucency, etc. Shaded pixels may be assembled in a frame buffer 135. Modern GPUs typically include programmable shaders that allow customization of shading and other processing steps by application developers. Thus, in various embodiments, the example elements of FIG. 1A may be performed in various orders, performed in parallel, or omitted. Additional processing steps may also be implemented.

Figure 1B:
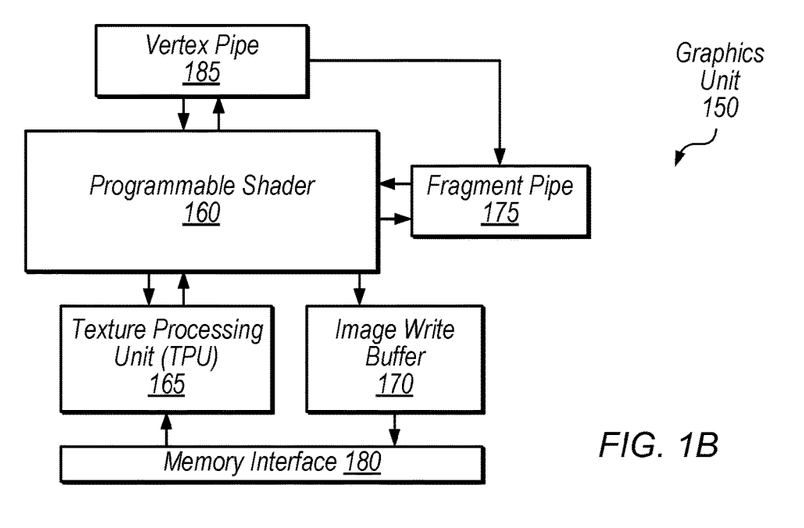
FIG. 1B is a block diagram illustrating an example graphics unit, according to some embodiments.

Referring now to FIG. 1B, a simplified block diagram illustrating a graphics unit 150 is shown, according to some embodiments. In the illustrated embodiment, graphics unit 150 includes programmable shader 160, vertex pipe 185, fragment pipe 175, texture processing unit (TPU) 165, image write unit 170, and memory interface 180. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 and/or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 and/or programmable shader 160 to generate fragment data. Vertex pipe 185 and/or fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and/or TPU 165. Programmable shader 160 may be configured to perform vertex processing tasks on vertex data which may include various transformations and/or adjustments of vertex data. Programmable shader 160, in the illustrated embodiment, is also configured to perform fragment processing tasks on pixel data such as texturing and shading, for example. Programmable shader 160 may include multiple execution pipelines for processing data in parallel.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write unit (IWU) 170, in some embodiments, is configured to store processed tiles of an image and may perform operations to a rendered image before it is transferred for display or to memory for storage. In some embodiments, graphics unit 150 is configured to perform tile-based deferred rendering (TBDR). In tile-based rendering, different portions of the screen space (e.g., squares or rectangles of pixels) may be processed separately. Memory interface 180 may facilitate communications with one or more of various memory hierarchies in various embodiments.

Overview of Cost Estimate Techniques for Frame Portions

In some embodiments, graphics unit 150 includes tile group cost estimation circuitry configured to estimate the processing resources (e.g., time, hardware, etc.) needed for processing a spatially local group of one or more tiles. In some embodiments, the estimate is based on the amount of geometry (e.g., number of primitives), types of objects (e.g., presence of translucent or feedback primitives), complexity of applied fragment shaders, primitive coverage area, tessellation patches, user input, texture information, level of detail, etc. In various embodiments, the graphics unit uses the estimate data to schedule portions of a render, e.g., such that they complete at approximately the same time. This may reduce idle time in shader processors and reduce render time randomness. The disclosed techniques may be particularly useful for scenes where small sections of renders take a disproportionately long time to complete.

In some embodiments, circuitry maintains a register value for each tile group for a graphics frame. Tile groups may include one or multiple tiles, in different implementations or operating modes. Each tile may include a set of pixels, e.g., 8×16, 16×16, 64×64, etc. Although tiles are discussed herein for purposes of explanation, disclosed systems may generate cost estimates for frame portions of various sizes or shapes. In some embodiments, each primitive that overlaps a tile causes an update to that tile's corresponding tile group cost estimate. The amount of the increase may be based on the type of primitive, cost of the fragment shader to be applied etc. In some embodiments, inputs to the cost estimate determination include driver information, compiler information (e.g., cost estimates for each shader passed to the driver), user input, etc.

In some embodiments, the cost estimates are counter values, where a larger value indicates a greater cost. For example, some implementations may include between 16 and 256 counters and each counter may include between 32 and 128 bits (although other ranges are contemplated). In some embodiments the device stores cost estimates in memory and does not quantize the counter values, enabling later retrieval for various potentially advantageous decisions by downstream circuitry, as discussed in further detail below. In some embodiments, the cost estimates may be further processed, e.g., to determine the maximum cost of a sub-region of a frame, which may allow distinguishing between regions with fairly similar costs among tile groups and other regions with more dynamic differences between cost among their tile groups. This may be particularly helpful when processing work is dispatched at a courser or finer granularity than cost estimates are generated. Note that a render may include many passes or layers.

Example Render Reduction Techniques Based on Comparison of Estimated Costs

Figure 2:
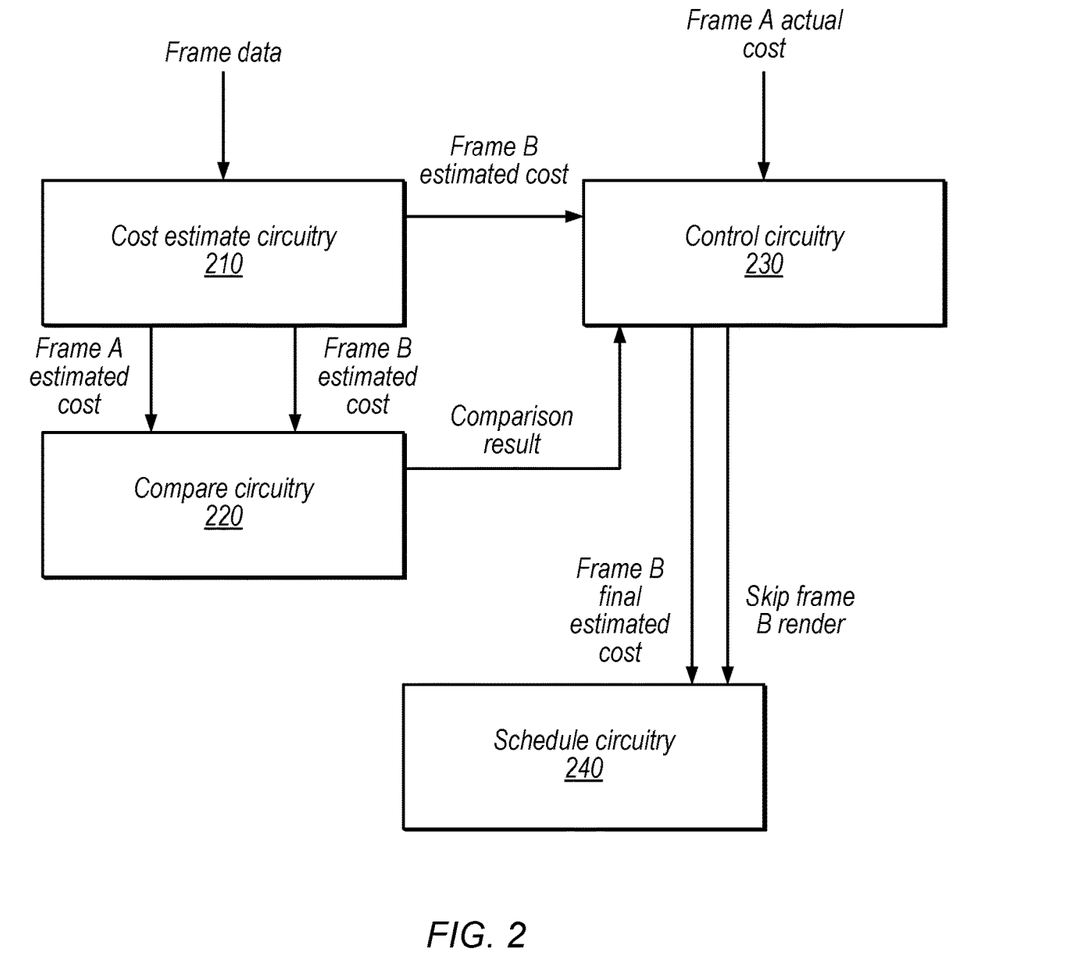
FIG. 2 is a block diagram illustrating example circuitry configured to control graphics processing based on cost estimates, according to some embodiments.

FIG. 2 is a block diagram illustrating an example system configured to determine whether to skip rendering of all or a portion of frame, according to some embodiments. Speaking generally, graphics frames are often duplicates or very similar, particularly if the frame is being refreshed rapidly at 30 Hz, 60 Hz, 120 Hz, etc. Identifying duplicate frames can be quite complex, however and the cost of identifying duplicate frames has typically been greater than the advantages of doing so. If duplicate frames can be identified, however, rendering of subsequent duplicate frames may be skipped and the previous rendering of the content displayed multiple times. In some embodiments, cost estimates are used as a proxy for frame similarity, as discussed in detail below. This comparison may be much less computationally intensive than comparing actual frame content, and the cost data may already be generated for scheduling purposes and therefore available for other techniques.

In some embodiments, the system is configured to skip rendering of a frame if it is determined that cost estimates for the frame have a threshold similarity with cost estimates for a previous frame. In the illustrated embodiment, the system includes cost estimate circuitry 210, compare circuitry 220, control circuitry 230, and schedule circuitry 240.

Cost estimate circuitry 210, in the illustrated embodiment, is configured to receive frame data for a frame B that is being rendered subsequently to a frame A. In the illustrated example, cost estimate circuitry 210 generates cost estimates for respective portions of both frames A and B and provides the cost estimates to compare circuitry 220. In some embodiments, the estimated costs include a 64-bit value for each frame portion.

Compare circuitry 220, in the illustrated embodiment, is configured to compare the estimated costs for frames A and B and generate a comparison result. The comparison result may include a single overall similarity value or may include multiple separate values, e.g., based on comparisons of co-located frame portions from the two frames. Cost estimates may be encoded in various ways or using various data structures. Therefore, compare circuitry 220 may perform various appropriate types of comparisons. For example, comparison circuitry 220 may determine the difference between cost estimate values for co-located frame portions from different frames. As another example, comparison circuitry 220 may determine the fraction of cost estimates fields or bits that are the same as (or within a threshold difference from) fields or bits of cost estimates for another render. In some embodiments, the cost estimate for each frame portion is a 64-bit counter that is incremented based on various factors, and comparison circuitry 220 determines the differences between 64-bit cost estimate values for tile groups from consecutive frames.

Control circuitry 230, in the illustrated embodiment, is configured to receive the frame B estimated cost, the comparison result, and actual cost data for frame A. The actual cost data may be generated based on actual rendering of frame A, and may include processing time, processing resources used, which circuitry was enabled or power gated during the rendering, etc. Control circuitry 230, in the illustrated embodiment, is configured to provide a final estimated cost for frame B and a signal indicating whether to skip rendering of frame B. Example logic implemented by control circuitry 230 is discussed in further detail below with reference to FIG. 3. In some embodiments, control circuitry 230 indicates to skip rendering of frame B if is it predicted to be a duplicate frame to frame A. Further, control circuitry 230 may update the frame B estimated cost based on the actual costs for frame A, if the frames meets a threshold similarity level.

Schedule circuitry 240, in the illustrated embodiment, is configured to schedule work for the frame B render based on the control signaling from control circuitry 230. For example, schedule circuitry may schedule rendering for relatively difficult portions of frame B to begin earlier than easier portions of frame B so that the different portions complete rendering at similar times.

Figure 3:
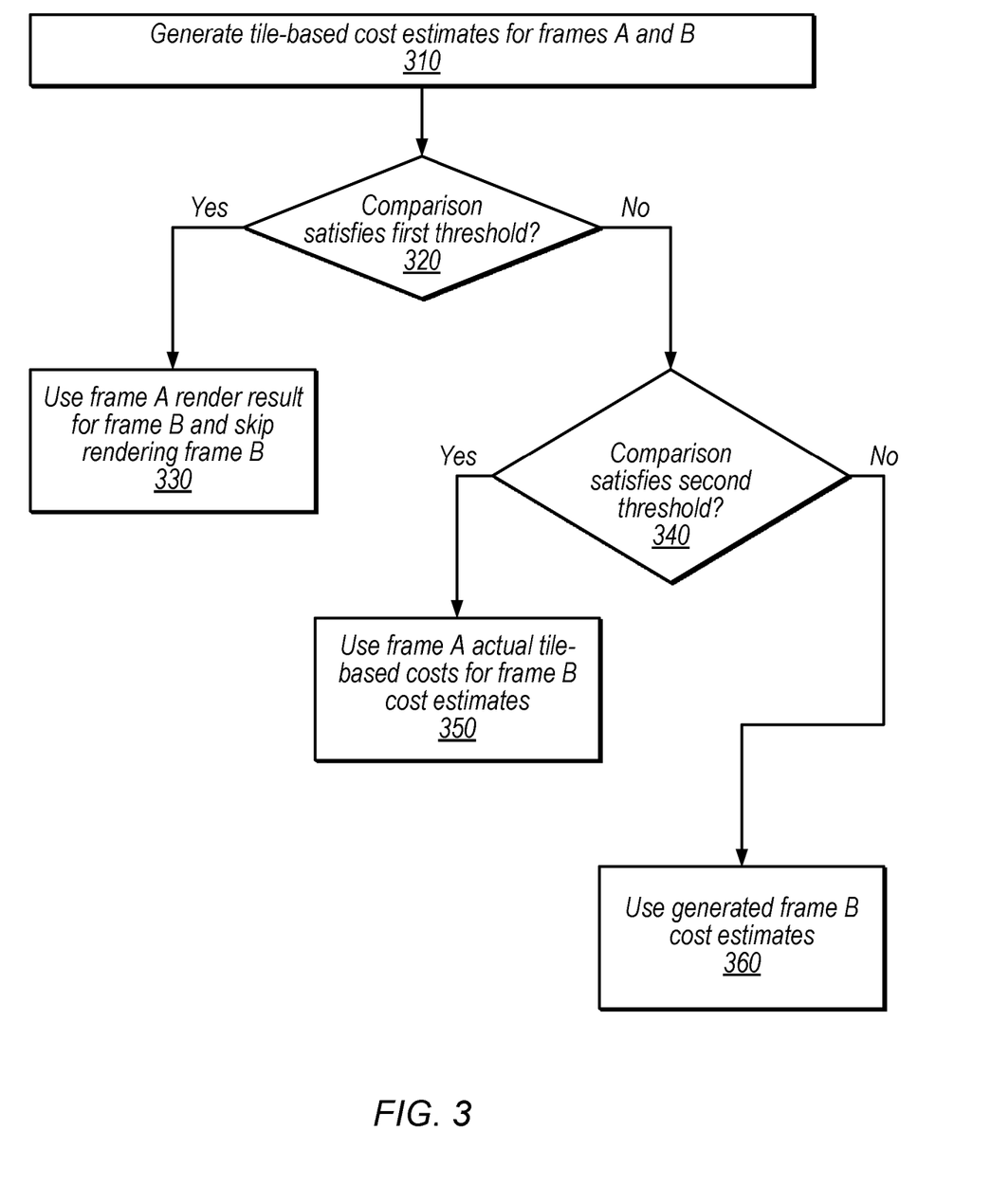
FIG. 3 is a flow diagram illustrating an example method for re-using at least a portion of a render or using actual render costs for a subsequent render, according to some embodiments.

FIG. 3 is a flow diagram illustrating an example method implemented by control circuitry, according to some embodiments. The method shown in FIG. 3 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 310, in the illustrated embodiment, circuitry (e.g., cost estimate circuitry 210) generates tile-based cost estimates for frames A and B. The cost estimates may be generated for each tile, portions of a tile, or tile groups that include multiple tiles, in various embodiments.

At 320, in the illustrated embodiment, control circuitry (e.g., control circuitry 230) determines whether the comparison satisfies a first threshold level of similarity. If so, flow proceeds to 330 and the device uses the frame A render result for frame B (and skips rendering of frame B). This may reduce power consumption or improve performance (e.g., by allowing processor resources to perform other tasks). In some embodiments, portions of frame A may be used instead of rendering those portions of frame B while other portions of frame B may be rendered, as discussed in further detail below. If the comparison does not satisfy the first threshold, flow proceeds to 340.

At 340, in the illustrated embodiment, control circuitry determines whether the comparison satisfies a second threshold (e.g., which may be a lower threshold than the first threshold). If the comparison satisfies the second threshold, flow proceeds to 350 and the device uses the frame A actual costs for frame B cost estimates. Note that the device may simply replace the frame B cost estimates with the frame A actual costs or may adjust the frame B cost estimates based on the frame A actual costs. In some embodiments, the adjustment is weighted based on the similarity between the cost estimates, e.g., with a stronger similarity resulting in a greater adjustment. In some embodiments, the comparison may be performed separately for each tile group; tile groups that meet the second threshold may use frame A actual costs while other tile groups may use only the frame B cost estimates. If the comparison does not satisfy the second threshold, flow proceeds to 360.

In some embodiments, the actual costs for frame A may include specific details such as memory read activity, cache use, etc. In some embodiments, the device may change power distribution for the frame B render based on the frame A actual costs, e.g., power gating circuitry determined not to be used or powering on circuitry that would have been helpful in efficiently processing frame A.

In some embodiments, the device may determine an offset value based on a difference between the frame A actual costs and the estimated costs for frame A. The device may apply this offset to the frame B cost estimates (alone or in combination with other techniques discussed with reference to FIG. 3) when frames A and B meet a similarity threshold based on their estimated costs. This is another example of using the frame A actual costs to adjust the frame B cost estimates indirectly.

At 360, in the illustrated embodiment, the device uses the generated frame B cost estimates, and does not use frame A cost data when scheduling tasks for frame B. This situation may occur when the frames are dissimilar to the extent that independent cost estimates are desirable. In some embodiments, the device is also configured to compare other information in addition to cost estimates, e.g., to check that the frames have the same resolution, pixel format, number of render layers, etc.

Figure 4:
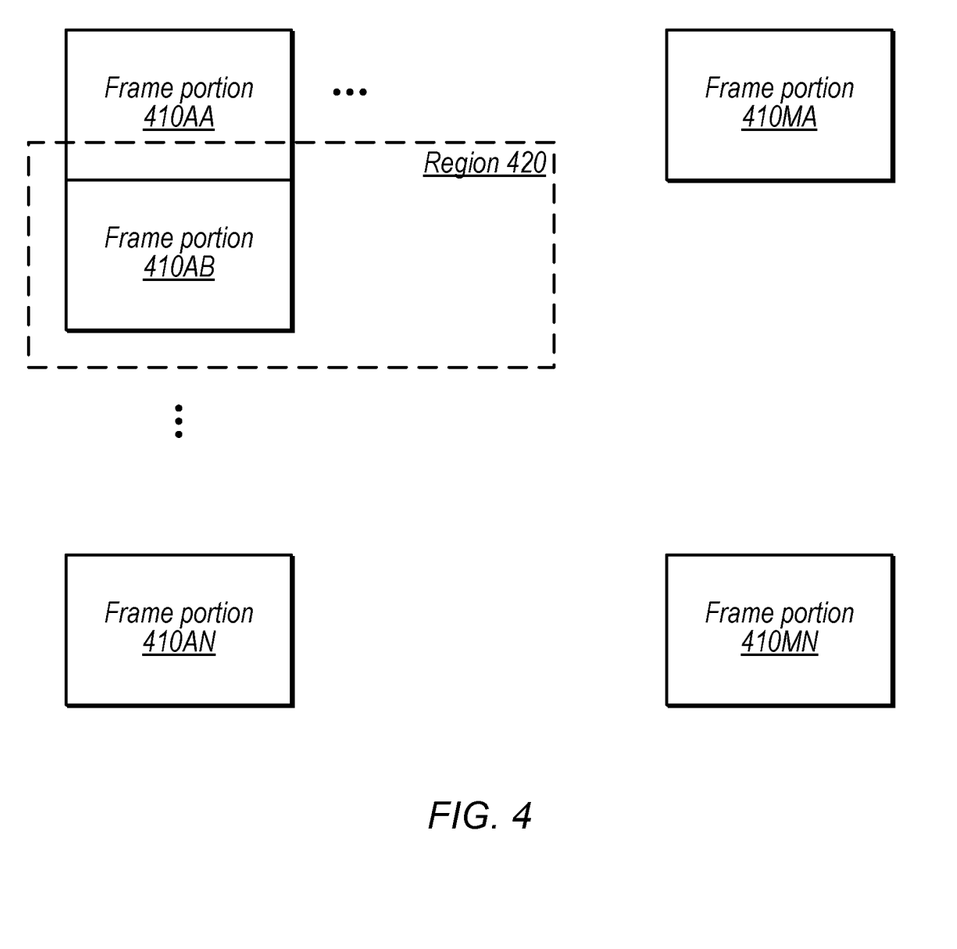
FIG. 4 is a diagram illustrating example frame portions and an example region where cost estimates meet a threshold similarity relative to cost estimates from a previous render, according to some embodiments.

FIG. 4 is a block diagram illustrating example frame portions included in a frame, according to some embodiments. In some embodiments, rendering may be skipped for some portions of a frame but not others. In the illustrated example, the frame includes frame portions 410AA-410MN (which are organized in M columns and N rows) and some of which are included in region 420. Consider a situation where the cost estimates for all the frame portions outside of region 420 are 100% matches with cost estimates for co-located frame portions in the prior render. In some embodiments, if a threshold number of frame portions have at least a threshold cost similarity with the prior frame, the device may skip rendering of those frame portions, but render the frame portions that do not meet the threshold cost similarity, for example. This approach may be useful in various real-world scenarios, e.g., when most of the frame may be showing a fixed image, but other portions may continue to update (e.g., sub-titles, dynamic logos, picture-in-picture video, etc.).

Speaking generally, a high similarity in cost for a single frame portion may not be a strong signal of matching content, e.g., because very different display content may randomly happen to have the same processing costs. As the number of frame portions with similar costs increases, however, (particularly contiguous frame portions), the confidence in matching content may increase. Therefore, in some embodiments, skipping at least a portion of a render may be triggered by a threshold number of contiguous frame portions meeting a threshold cost similarity.

In various embodiments, the disclosed techniques may advantageously reduce rendering costs and provide more accurate cost estimates.

Example Context Switch Logic Based on Estimated Costs

Figure 5:
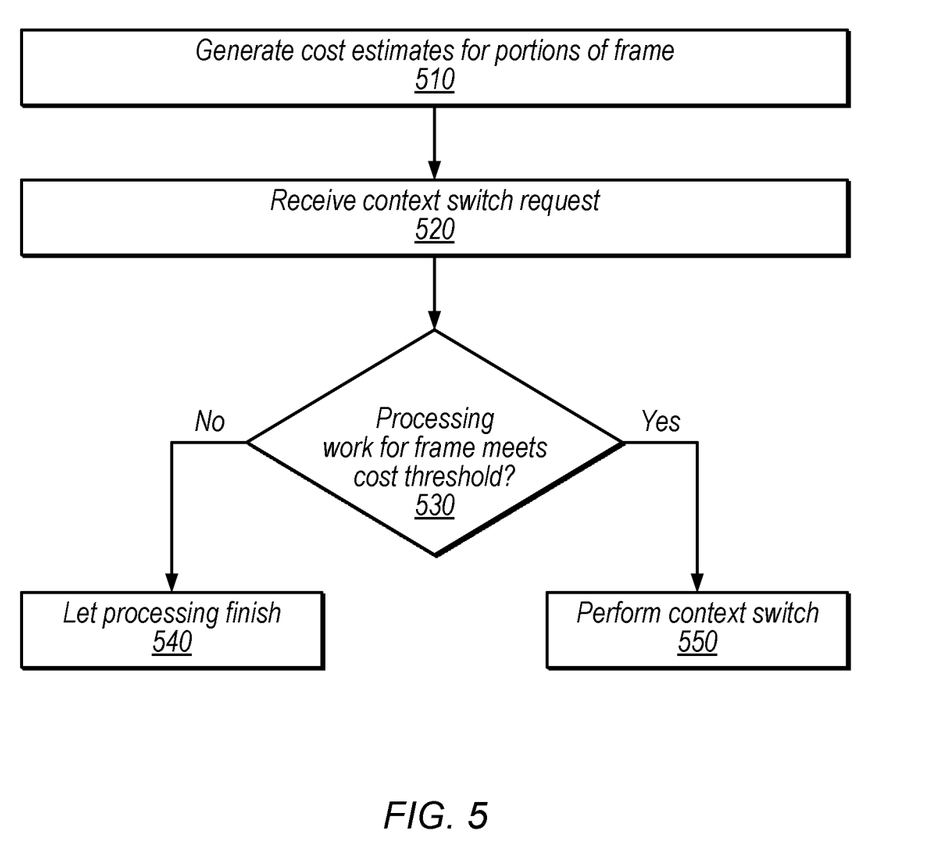
FIG. 5 is a flow diagram illustrating an example method for determining whether to perform a context switch based on cost estimates, according to some embodiments.

FIG. 5 is a flow diagram illustrating an example method for controlling context switching based on cost estimates for portions of a graphics frame. Context switching may have processing overhead, e.g., for storing execution state for the context being switched out. For example, U.S. patent application Ser. No. 16/749,618 filed Jan. 22, 2020 discusses example context switch techniques for a thread group, which may provide an upper bound on context switch latency. In some embodiments, the graphics processor determines whether to perform a context switch based on cost estimate data.

At 510, in the illustrated embodiment, the device generates cost estimates for portions of the frame, e.g., using various techniques discussed above. The cost estimates may incorporate actual processing times for one or more previous renders that have a threshold level of similarity with the current render.

At 520, in the illustrated embodiment, the device receives a context switch request. In some situations, the work being context-switched in may be for a high priority task. The device may be currently executing work for which the cost estimates were generated at element 510.

At 530, in the illustrated embodiment, the device determines whether processing work for the frame meets a cost threshold. This may be based on a remaining amount of work determined based on completion data and the cost estimates. Alternatively, this determination may be based on the entire amount of work for the currently-executing task, e.g., in implementations where execution status is not available. If the work meets the threshold, flow proceeds to 550 and the device performs the context switch. Otherwise, flow proceeds to 540 and the device allows the processing to finish rather than performing a context switch. The disclosed techniques may advantageously improve overall performance and power consumption, e.g., by avoiding context switches when the currently-executing work is non-complex or the currently-executing work is almost finished executing. Note that in some situations where the device would normally wait to see if an executing task will finish before performing a context switch, the device may instead force an immediate context switch, e.g., if the cost estimates for the currently-executing task indicate that it is a complex task.

In some embodiments, the device executes applications where latency is particularly important. For example, for augmented reality or virtual reality workloads, latency in rendering may cause user discomfort or sickness. As another example, for synchronized graphics processing such as vertical sync, the device may want to finish a buffer that is about to be sent out (e.g., to meet the vsync target). In some embodiments, the device is configured to avoid scheduling complex work during these intervals (based on cost estimate data) in order to meet timing targets. In some embodiments, the device maintains mapping information between graphics work (e.g., graphics kicks) and the frame portions on which they operate, which may allow determination of which kicks should be dispatched (or not), context switched out, allowed to finish executing, etc.

Example Workload Scheduling Based on Estimated Costs

Figure 6:
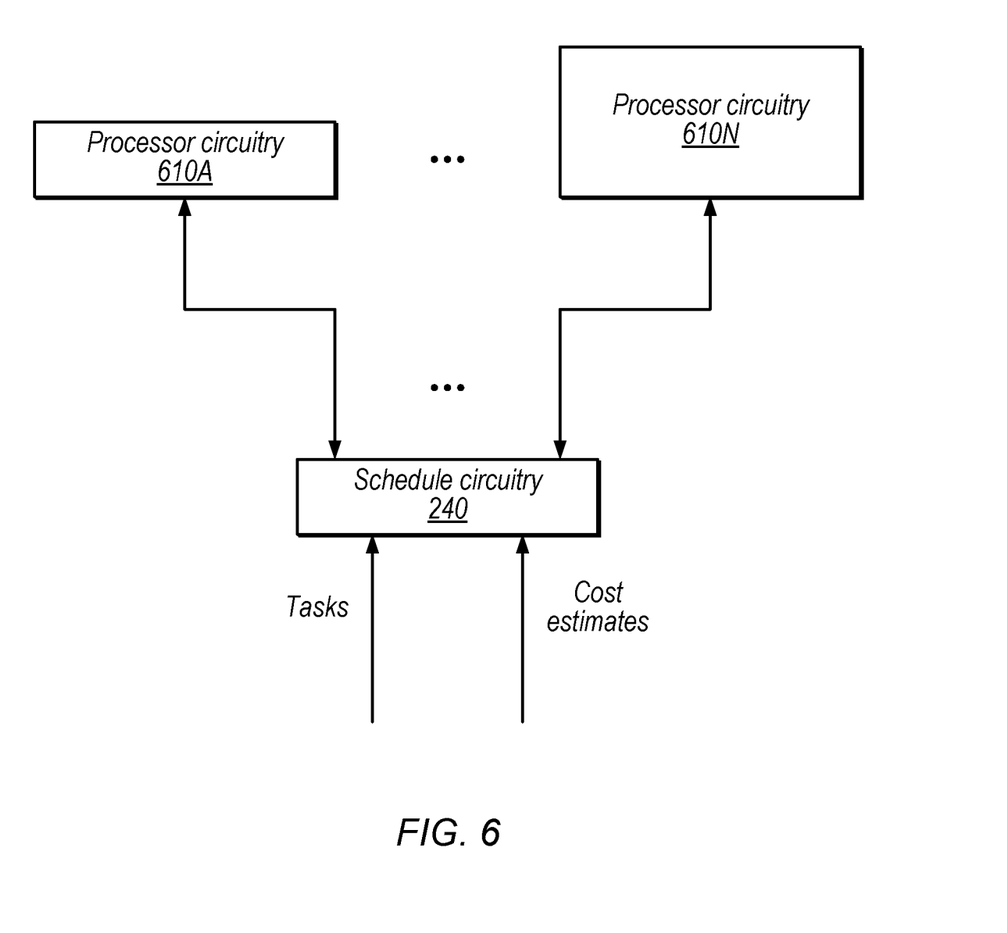
FIG. 6 is a flow diagram illustrating example schedule circuitry configured to send graphics tasks for processor circuitry with different capabilities, according to some embodiments.

FIG. 6 is a simplified block diagram illustrating example dispatch of graphics work to different processor circuits. In the illustrated embodiment, schedule circuitry 240 is configured to dispatch graphics work to multiple sets of processor circuitry 610A-610N. Schedule circuitry 240 receives tasks for graphics renders and cost estimates for corresponding frame portions.

Processor circuits 610 may be different processor cores, for example. The device may power down unused processor cores to reduce power consumption. In other embodiments, different processor circuits 610 represent different GPUs. In some embodiments, different processor circuits 610 have different capabilities. For example, one processor may have greater parallel processing capabilities, specialized circuitry for certain types of operations, additional associated circuitry such as caches or memory allocation, etc. Processor circuits with different capabilities may also have different area, power consumption, etc.

Schedule circuitry 240 may implement various distribution techniques when sending work for processing based on cost estimates. For example, schedule circuitry 240 may balance work sent to different processor circuitry by sending work to least-busy circuitry. Processor circuits 610 may indicate completions of dispatched work (or other status data) to schedule circuitry 240, allowing the schedule circuitry 240 to determine outstanding work at each processor circuit 610. As another example, schedule circuitry 240 may focus dispatching to a subset of processor circuits to enable powering down of other processor circuits. Dispatching work based on cost estimates may advantageously improve performance relative to simply counting the number of tiles sent to each core, for example. As previously discussed, schedule circuitry 240 may attempt to schedule work for a render such that it finishes at approximately the same time.

The device may generate a cost for a render as a whole that incorporates tile-group cost estimates and schedule the render based on this cost. In other embodiments, the device may pass specific details for tiles or tile groups, including how many are left in a render and the cost estimate for each.

In some embodiments, accurate cost estimates may allow schedule circuitry 240 to implement just-in-time rendering in which it does not send work for a render until just before the point in time at which the work must begin in order to complete when the render is due (according to the cost estimates). This may advantageously reduce re-rendering, in various implementations. In some embodiments, schedule circuitry 240 is configured to implement such just-in-time rendering techniques only when it has a threshold confidence in its cost estimate predictions. For example, schedule circuitry 240 may use just-in-time rendering only when actual costs for a previous render are used for the current render (e.g., based on a threshold level of similarity between estimated costs for the two renders, as discussed above with reference to element 350 of FIG. 3).

As discussed above, the device may also determine offset information based on the difference between estimated and actual costs for a frame. Use of this information to inform cost estimates for subsequent frames may allow adjustments of actual costs to improve cost accuracy. Further, the device may use this offset information to determine a padding interval for just-in-time rendering to allow for some level of mis-prediction in frame cost estimates without missing a render target.

Example Method

Figure 7:
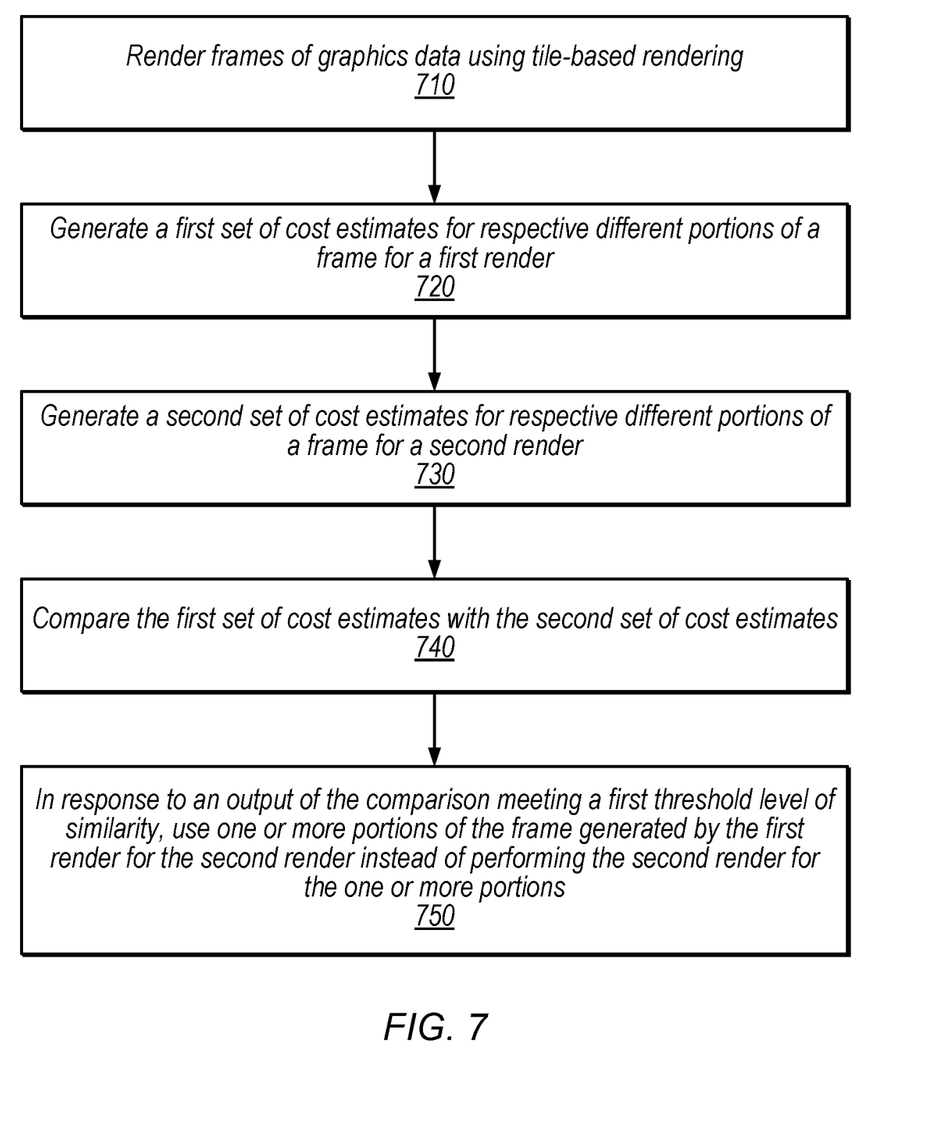
FIG. 7 is a flow diagram illustrating another example method, according to some embodiments.

FIG. 7 is a flow diagram illustrating an example method for using frame portion cost estimates, according to some embodiments. The method shown in FIG. 7 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 710, in the illustrated embodiment, a graphics processors renders frames of graphics data using tile-based rendering. This may include separately processing tiles of the graphics frame and stitching results together before outputting the frame for display. Scheduling circuitry may assign different tiles to different portions of the graphics processor for processing in at least partially in parallel.

At 720, in the illustrated embodiment, the graphics processor generates a first set of cost estimates for respective different portions of a frame for a first render. For example, the processor may generate a counter value for each tile group in the frame.

At 730, in the illustrated embodiment, the graphics processor generates a second set of cost estimates for respective different portions of a frame for a second render.

At 740, in the illustrated embodiment, the graphics processor compares the first set of cost estimates with the second set of cost estimates. For example, the processor may compare counter values for co-located tile groups. The processor may determine the number of matching counters, number of counters that vary less than a threshold amount, average difference between the two sets of cost estimates, etc.

At 750, in the illustrated embodiment, in response to an output of the comparison meeting a first threshold level of similarity, the graphics processor uses one or more portions of the frame generated by the first render for the second render instead of performing the second render for the one or more portions. The processor may use the entire frame from the first render and not perform the second render. In other situations, the processor may, in response to determining that a threshold number of cost estimates in the first and second sets of cost estimates meet a threshold level of similarity, use the portions of the frame generated by the first render for those portions and perform the second render only for other portions of the frame.

In some embodiments, the processor, in response to the output of the comparison meeting a second threshold level of similarity that is less than the first threshold level, schedules one or more rendering tasks for the second render based on actual cost information from the first render. For example, for tile groups that meet the second threshold, the processor may use the actual tile group costs from the first render, or adjust the second set of cost estimates based on the actual tile group costs from the first render. In some embodiments, if the output of the comparison does not meet the second threshold level of similarity, the processor schedules one or more rendering tasks for the second render based on the first set of cost estimates without using the actual cost information from the first render.

In some embodiments, scheduling circuitry of the processor sends render takes to different ones of multiple processor cotes based on the first set of cost estimates. For example, the cores may include processor cores with different processing capabilities and the scheduling circuitry may send a first render task to a first processor core and a second render task to a second processor core, where the first render task has a greater corresponding cost estimate than the second render task, the first processor core is more capable than the second processor core. Similar techniques may be used for scheduling tasks on circuitry at various granularities, including portions of a processor core, processors that may include multiple cores, etc.

In some embodiments, the graphics processor determines determine whether to perform a context switch during the first render or wait for completion of the first render based on the first set of cost estimates. For example, if the cost estimates indicate that the first render will complete within a threshold time interval, the processor may wait for the first render to complete rather than performing a context switch.

In some embodiments, the processor may, based on a latency constraint, refrain from scheduling one or more portions of the graphics frame for processing based on one or more corresponding cost estimates exceeding a cost threshold. For example, when approaching a vsync deadline, the processor may refrain from scheduling tasks from tile groups with cost estimates that exceed a threshold.

Example Device

Figure 8:
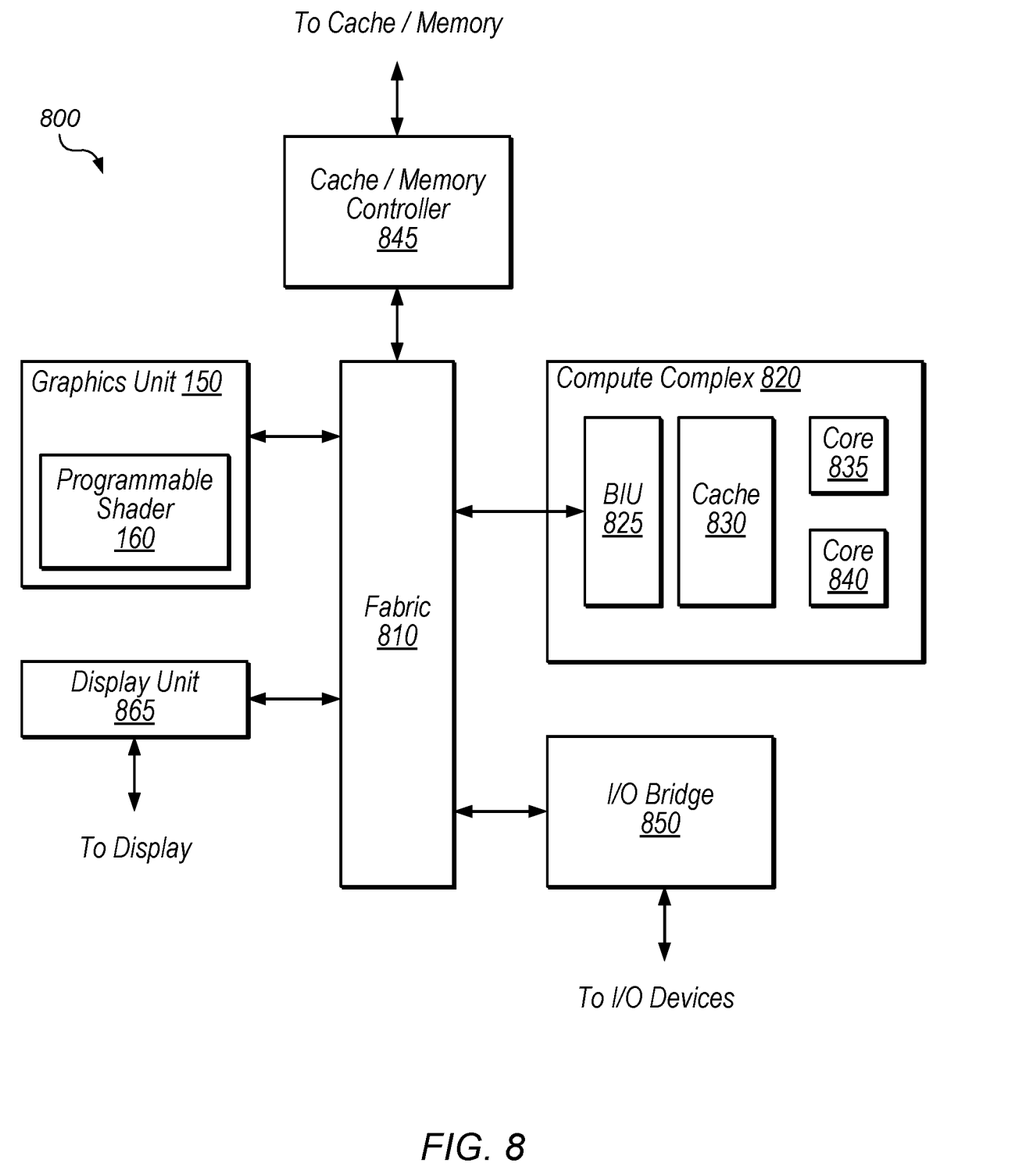
FIG. 8 is a block diagram illustrating an example computing device, according to some embodiments.

Referring now to FIG. 8, a block diagram illustrating an example embodiment of a device 800 is shown. In some embodiments, elements of device 800 may be included within a system on a chip. In some embodiments, device 800 may be included in a mobile device, which may be battery-powered. Therefore, power consumption by device 800 may be an important design consideration. In the illustrated embodiment, device 800 includes fabric 810, compute complex 820 input/output (I/O) bridge 850, cache/memory controller 845, graphics unit 150, and display unit 865. In some embodiments, device 800 may include other components (not shown) in addition to and/or in place of the illustrated components, such as video processor encoders and decoders, image processing or recognition elements, computer vision elements, etc.

Fabric 810 may include various interconnects, buses, MUX's, controllers, etc., and may be configured to facilitate communication between various elements of device 800. In some embodiments, portions of fabric 810 may be configured to implement various different communication protocols. In other embodiments, fabric 810 may implement a single communication protocol and elements coupled to fabric 810 may convert from the single communication protocol to other communication protocols internally.

In the illustrated embodiment, compute complex 820 includes bus interface unit (BIU) 825, cache 830, and cores 835 and 840. In various embodiments, compute complex 820 may include various numbers of processors, processor cores and/or caches. For example, compute complex 820 may include 1, 2, or 4 processor cores, or any other suitable number. In one embodiment, cache 830 is a set associative L2 cache. In some embodiments, cores 835 and/or 840 may include internal instruction and/or data caches. In some embodiments, a coherency unit (not shown) in fabric 810, cache 830, or elsewhere in device 800 may be configured to maintain coherency between various caches of device 800. BIU 825 may be configured to manage communication between compute complex 820 and other elements of device 800. Processor cores such as cores 835 and 840 may be configured to execute instructions of a particular instruction set architecture (ISA) which may include operating system instructions and user application instructions.

Cache/memory controller 845 may be configured to manage transfer of data between fabric 810 and one or more caches and/or memories. For example, cache/memory controller 845 may be coupled to an L3 cache, which may in turn be coupled to a system memory. In other embodiments, cache/memory controller 845 may be directly coupled to a memory. In some embodiments, cache/memory controller 845 may include one or more internal caches.

As used herein, the term "coupled to" may indicate one or more connections between elements, and a coupling may include intervening elements. For example, in FIG. 8, graphics unit 150 may be described as "coupled to" a memory through fabric 810 and cache/memory controller 845. In contrast, in the illustrated embodiment of FIG. 8, graphics unit 150 is "directly coupled" to fabric 810 because there are no intervening elements.

Graphics unit 150 may include one or more processors and/or one or more graphics processing units (GPU's). Graphics unit 150 may receive graphics-oriented instructions, such as OPENGL®, Metal, or DIRECT3D® instructions, for example. Graphics unit 150 may execute specialized GPU instructions or perform other operations based on the received graphics-oriented instructions. Graphics unit 150 may generally be configured to process large blocks of data in parallel and may build images in a frame buffer for output to a display. Graphics unit 150 may include transform, lighting, triangle, and/or rendering engines in one or more graphics processing pipelines. Graphics unit 150 may output pixel information for display images. Programmable shader 160, in various embodiments, may include highly parallel execution cores configured to execute graphics programs, which may include pixel tasks, vertex tasks, and compute tasks (which may or may not be graphics-related).

In some embodiments, graphics unit 150 includes the circuitry discussed herein.

Display unit 865 may be configured to read data from a frame buffer and provide a stream of pixel values for display. Display unit 865 may be configured as a display pipeline in some embodiments. Additionally, display unit 865 may be configured to blend multiple frames to produce an output frame. Further, display unit 865 may include one or more interfaces (e.g., MIPI® or embedded display port (eDP)) for coupling to a user display (e.g., a touchscreen or an external display).

I/O bridge 850 may include various elements configured to implement: universal serial bus (USB) communications, security, audio, and/or low-power always-on functionality, for example. I/O bridge 850 may also include interfaces such as pulse-width modulation (PWM), general-purpose input/output (GPIO), serial peripheral interface (SPI), and/or inter-integrated circuit (I2C), for example. Various types of peripherals and devices may be coupled to device 800 via I/O bridge 850.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 9:
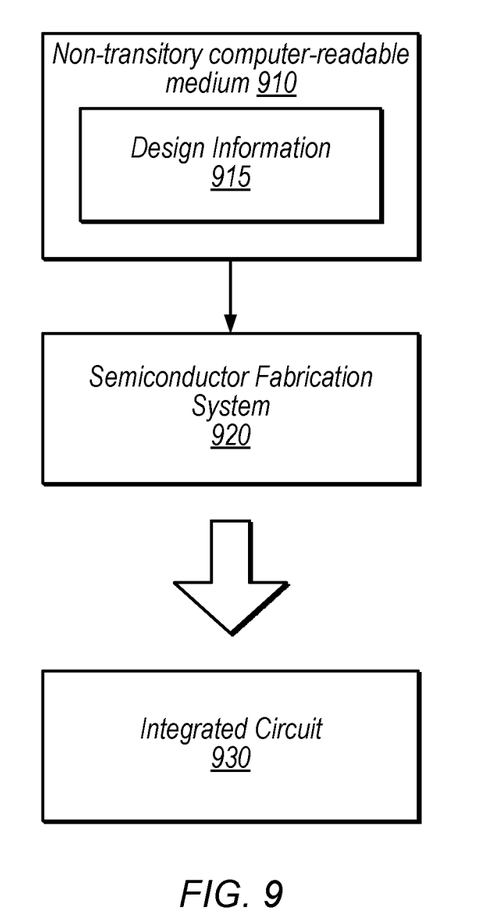
FIG. 9 is a block diagram illustrating an example computer-readable medium that stores circuit design information, according to some embodiments.

FIG. 9 is a block diagram illustrating an example non-transitory computer-readable storage medium that stores circuit design information, according to some embodiments. In the illustrated embodiment semiconductor fabrication system 920 is configured to process the design information 915 stored on non-transitory computer-readable medium 910 and fabricate integrated circuit 930 based on the design information 915.

Non-transitory computer-readable storage medium 910, may comprise any of various appropriate types of memory devices or storage devices. Non-transitory computer-readable storage medium 910 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 910 may include other types of non-transitory memory as well or combinations thereof. Non-transitory computer-readable storage medium 910 may include two or more memory mediums which may reside in different locations, e.g., in different computer systems that are connected over a network.

Design information 915 may be specified using any of various appropriate computer languages, including hardware description languages such as, without limitation: VHDL, Verilog, SystemC, System Verilog, RHDL, M, MyHDL, etc. Design information 915 may be usable by semiconductor fabrication system 920 to fabricate at least a portion of integrated circuit 930. The format of design information 915 may be recognized by at least one semiconductor fabrication system 920. In some embodiments, design information 915 may also include one or more cell libraries which specify the synthesis and/or layout of integrated circuit 930. In some embodiments, the design information is specified in whole or in part in the form of a netlist that specifies cell library elements and their connectivity. Design information 915, taken alone, may or may not include sufficient information for fabrication of a corresponding integrated circuit. For example, design information 915 may specify the circuit elements to be fabricated but not their physical layout. In this case, design information 915 may need to be combined with layout information to actually fabricate the specified circuitry.

Integrated circuit 930 may, in various embodiments, include one or more custom macrocells, such as memories, analog or mixed-signal circuits, and the like. In such cases, design information 915 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 920 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 920 may also be configured to perform various testing of fabricated circuits for correct operation.

In various embodiments, integrated circuit 930 is configured to operate according to a circuit design specified by design information 915, which may include performing any of the functionality described herein. For example, integrated circuit 930 may include any of various elements shown in FIGS. 1B, 2, or 8. Further, integrated circuit 930 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
rendering circuitry configured to render frames of graphics data using tile-based rendering;
cost estimate circuitry configured to:
generate a first set of cost estimates for respective different frame portions for a render of a first frame;
generate a second set of cost estimates for respective different frame portions for a render of a second frame, wherein respective frame portions for the first frame are co-located with respective different frame portions of the second frame, and wherein the first frame is for display at a different time than the second frame;
wherein respective cost estimates of the first and second sets of cost estimates indicate a complexity of processing for a given frame portion;
wherein the apparatus is configured to:
compare the first set of cost estimates with the second set of cost estimates; and
in response to a cost estimate comparison output for a frame portion that is co-located in the first and second frames meeting a first threshold level of similarity, use one or more portions of the frame generated by the render of the first frame for the render of the second frame instead of performing the render of the second frame for the one or more portions.

2. The apparatus of claim 1, wherein the apparatus is further configured to:
in response to the comparison output meeting a second threshold level of similarity that is less than the first threshold level, schedule one or more rendering tasks for the render of the second frame based on actual cost information from the render of the first frame.

3. The apparatus of claim 2, wherein the apparatus is further configured to:
in response to the comparison output failing to meet the second threshold level of similarity, schedule one or more rendering tasks for the render of the second frame based on the second set of cost estimates without using the actual cost information from the render of the first frame.

4. The apparatus of claim 1, wherein the apparatus further is configured to:
in response to determining that a threshold number of cost estimates in the first and second sets of cost estimates meet a threshold level of similarity, use the portions of the first frame generated by the render of the first frame for those portions and perform the render of the second frame only for other portions of the second frame.

5. The apparatus of claim 1, further comprising:
multiple processor cores; and
scheduling circuitry configured to send render tasks to ones of the multiple processor cores based on the first set of cost estimates.

6. The apparatus of claim 5, wherein the multiple processor cores include processor cores with different processing capabilities and the scheduling circuitry is configured to send a first render task to a first processor core and a second render task to a second processor core, wherein the first render task has a greater corresponding cost estimate than the second render task, the first processor core is more capable than the second processor core.

7. The apparatus of claim 1, wherein the apparatus is further configured to:
   determine whether to perform a context switch during the render of the first frame or wait for completion of the render of the first frame based on the first set of cost estimates.
8. The apparatus of claim 1, wherein the apparatus is further configured to:
   based on a latency constraint, refrain from scheduling one or more portions of the first frame for processing based on one or more corresponding cost estimates exceeding a cost threshold.
9. A method, comprising:
   rendering, by a graphics processor, frames of graphics data using tile-based rendering;
   generating, by the graphics processor, a first set of cost estimates for respective different frame portions for a render of a first frame;
   generating, by the graphics processor, a second set of cost estimates for respective different frame portions for a render of a second frame, wherein respective frame portions for the first frame are co-located with respective different frame portions of the second frame, and wherein the first frame is for display at a different time than the second frame;
   wherein respective cost estimates of the first and second sets of cost estimates indicate a complexity of processing for a given frame portion;
   comparing, by the graphics processor, the first set of cost estimates with the second set of cost estimates; and
   in response to a cost estimate comparison output for a frame portion that is co-located in the first and second frames meeting a first threshold level of similarity, the graphics processor using one or more portions of the frame generated by the render of the first frame for the render of the second frame instead of performing the render of the second frame for the one or more portions.
10. The method of claim 9, further comprising:
    in response to the comparison output of sets of cost estimates for different renders meeting a second threshold level of similarity that is less than the first threshold level, scheduling one or more rendering tasks for a subsequent render based on actual cost information from a previous render.
11. The method of claim 9, further comprising:
    in response to determining that a threshold number of cost estimates in the first and second sets of cost estimates meet a threshold level of similarity, using the portions of the first frame generated by the render of the first frame for those portions and performing the render of the second frame only for other portions of the second frame.
12. The method of claim 9, further comprising:
    scheduling circuitry render tasks to ones of multiple processor cores based on the first set of cost estimates.
13. The method of claim 9, further comprising:
    determining whether to perform a context switch during the render of the first frame or wait for completion of the render of the first frame based on the first set of cost estimates.
14. The method of claim 9, further comprising:
    based on a latency constraint, refraining from scheduling one or more portions of the first frame for processing based on one or more corresponding cost estimates exceeding a cost threshold.
15. A non-transitory computer readable storage medium having stored thereon design information that specifies a design of at least a portion of a hardware integrated circuit in a format recognized by a semiconductor fabrication system that is configured to use the design information to produce the circuit according to the design, wherein the design information specifies that the circuit includes:
    rendering circuitry configured to render frames of graphics data using tile-based rendering;
    cost estimate circuitry configured to:
       generate a first set of cost estimates for respective different frame portions for a render of a first frame;
       generate a second set of cost estimates for respective different frame portions for a render of a second frame, wherein respective frame portions for the first frame are co-located with respective different frame portions of the second frame, and wherein the first frame is for display at a different time than the second frame;
    wherein respective cost estimates of the first and second sets of cost estimates indicate a complexity of processing for a given frame portion;
    wherein the circuit is configured to:
       compare the first set of cost estimates with the second set of cost estimates; and
       in response to a comparison output for a frame portion that is co-located in the first and second frames meeting a first threshold level of similarity, use one or more portions of the frame generated by the render of the first frame for the render of the second frame instead of performing the render of the second frame for the one or more portions.
16. The non-transitory computer readable storage medium of claim 15, wherein the circuit is further configured to:
    in response to the comparison output meeting a second threshold level of similarity that is less than the first threshold level, schedule one or more rendering tasks for the render of the second frame based on actual cost information from the render of the first frame.
17. The non-transitory computer readable storage medium of claim 15, wherein the circuit is further configured to:
    in response to determining that a threshold number of cost estimates in the first and second sets of cost estimates meet a threshold level of similarity, use the portions of the first frame generated by the render of the first frame for those portions and perform the render of the second frame only for other portions of the second frame.
18. The non-transitory computer readable storage medium of claim 15, wherein the circuit further comprises:
    multiple processor cores; and
    scheduling circuitry configured to send render tasks to ones of the multiple processor cores based on the first set of cost estimates.
19. The non-transitory computer readable storage medium of claim 15, wherein the circuit is further configured to:
    determine whether to perform a context switch during the render of the first frame or wait for completion of the render of the first frame based on the first set of cost estimates.
20. The non-transitory computer readable storage medium of claim 15, wherein the circuit is further configured to:
    based on a latency constraint, refrain from scheduling one or more portions of the first frame for processing based on one or more corresponding cost estimates exceeding a cost threshold.

* * * * *